May 12, 1953 C. R. MYERS ET AL 2,637,976
ACTUATOR MOTOR DEVICE FOR HYDRAULIC BRAKES
Filed Aug. 7, 1951 3 Sheets-Sheet 1

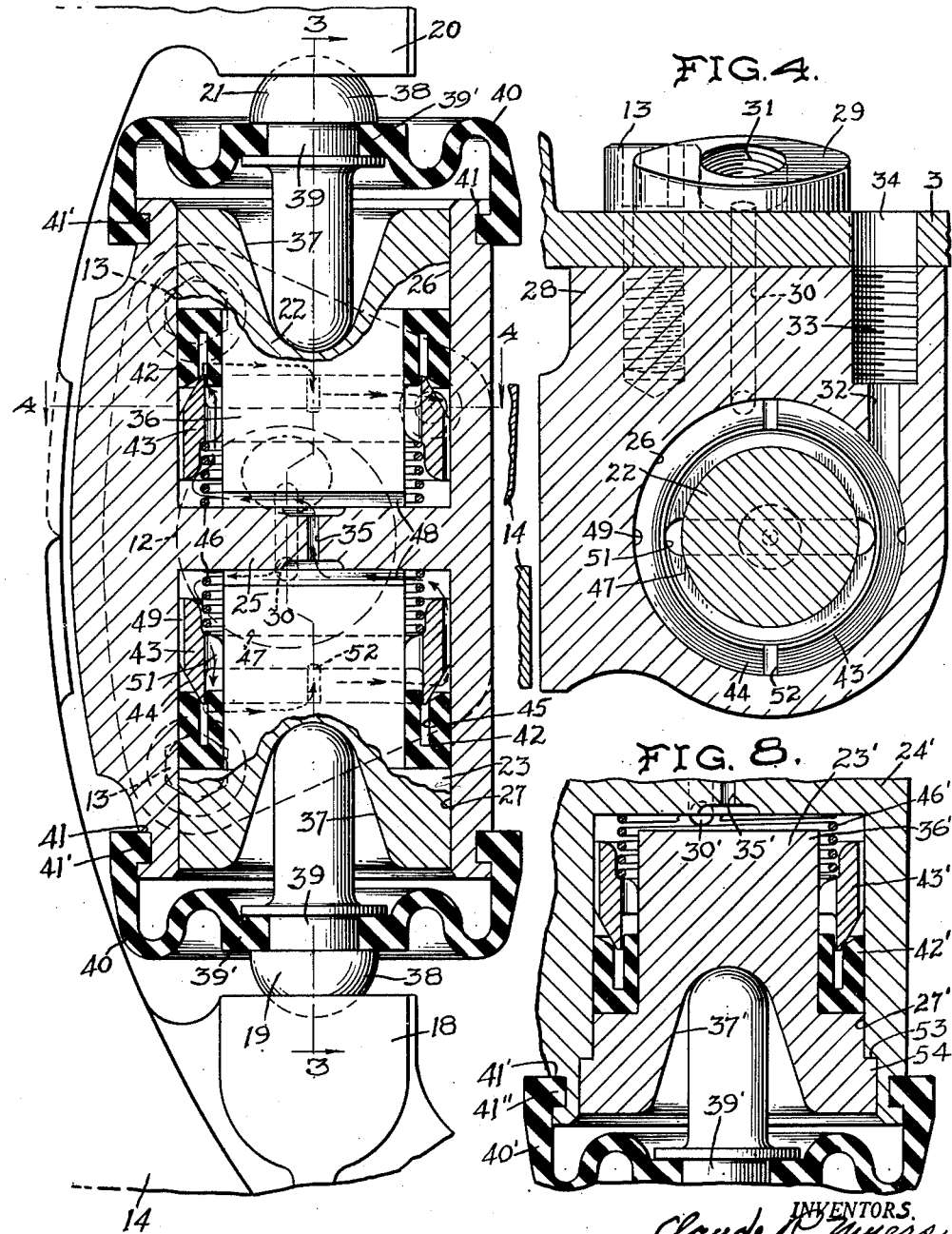

May 12, 1953 C. R. MYERS ET AL 2,637,976
ACTUATOR MOTOR DEVICE FOR HYDRAULIC BRAKES
Filed Aug. 7, 1951 3 Sheets-Sheet 3
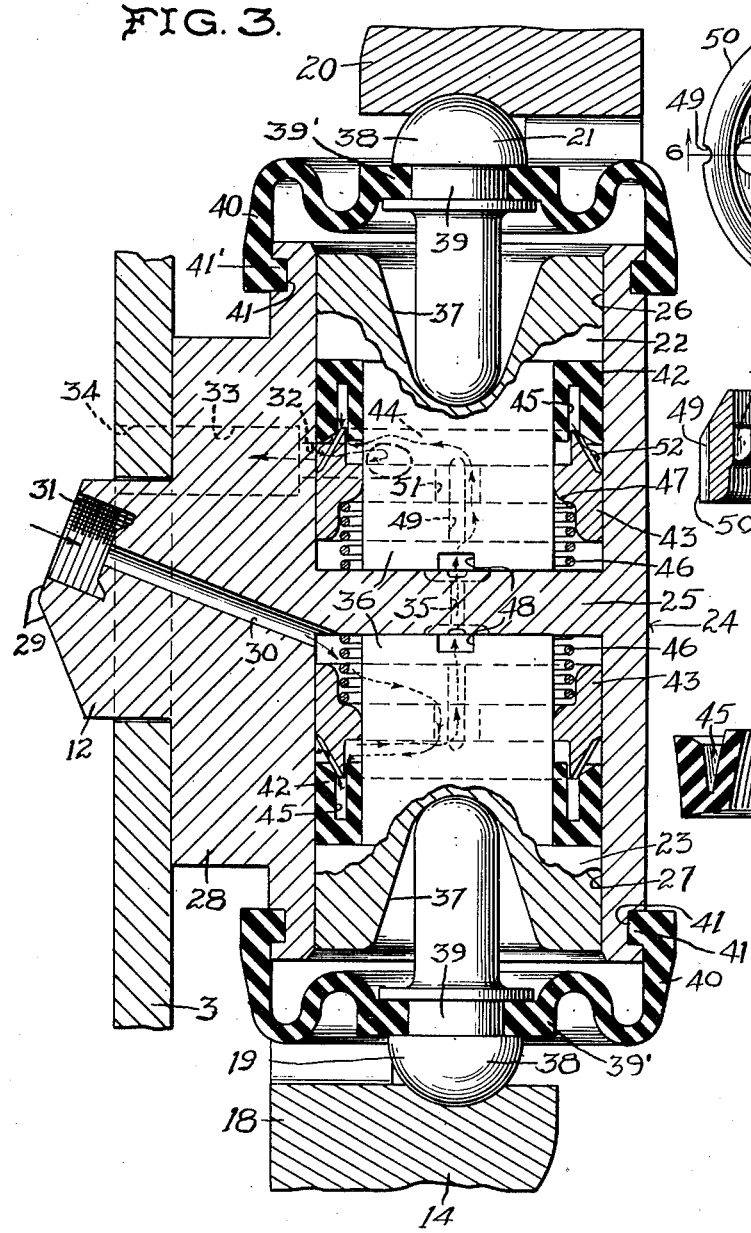
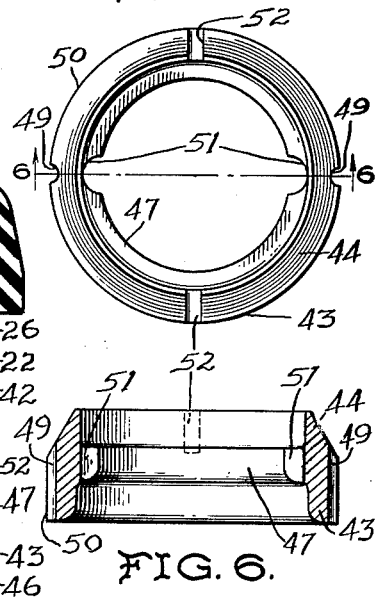
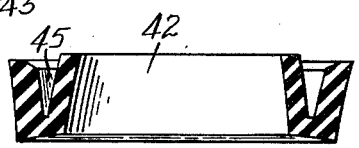
INVENTORS.
Claude R. Myers
Lester F. Dasse
BY John Bassett
Robert Cobb
Attorneys Patented May 12, 1953

2,637,976

UNITED STATES PATENT OFFICE 2,637,976

ACTUATOR MOTOR DEVICE FOR HYDRAULIC BRAKES

Claude R. Myers, Galien, Lester F. Dasse, St. Joseph, and John Bassett, Benton Harbor, Mich., assignors, by mesne assignments, to Lambert Brake Corporation, St. Joseph, Mich., a corporation of Michigan Application August 7, 1951, Serial No. 240,642

16 Claims. (Cl. 60—54.6)

The present invention relates to a fluid pressure responsive actuator device for use in hydraulic brake systems or the like, wherein a pressure fluid is forced from the main or master cylinder to one or more actuator cylinders, each preferably having a pair of opposed pistons reciprocally mounted therein and operatively connected to friction members for controlling the application and release of the brakes.

More particularly, the invention concerns means for facilitating the bleeding of air from the hydraulic system in such a manner as to effectively wash any minute air pockets or bubbles out of each actuator cylinder.

When air finds access into a hydraulic system in which the pressure fluid is utilized to transmit thrust, the operativeness of the system is seriously impaired due to the compressibility of the air. This is especially true in hydraulic brake systems wherein the air pockets are compressed by the fluid pressure, and require a substantial increase in the pedal movement of the conventional brake system, resulting in what is sometimes referred to as a "spongy pedal," and may even require "pumping" before the brake can be effectively applied.

Another disadvantage of air in a hydraulic brake system, particularly in motor vehicle installations, is the uneven braking action of the brake on different wheels caused by air pockets in only some of the fluid lines or in only some of the actuator or wheel cylinders. This has caused many serious accidents.

Therefore, the fluid brake systems on motor vehicles have to be bled to remove any air entrapped therein, but there is no certainty that the bleeding operation will actually remove all of the air, especially since the usual practice is to merely allow the air to rise to the high points in the fluid system pursuant to the relative difference in the specific gravity of the air and the hydraulic fluid, and then bleed off the air from these high points.

It is the primary object of the present invention to provide means for effectively bleeding hydraulic brake systems including the actuator cylinders, thereby insuring that all of the air therein is removed from the system.

Another object is to provide an improved wheel or actuator cylinder for motor vehicle hydraulic brake systems, which is so constructed and arranged as to enable the same to be completely flushed or washed free of air bubbles or pockets during the bleeding operation.

A further object is to provide a double-acting actuator cylinder having a pair of opposed piston chambers and oppositely reciprocable pistons therein, and having means for flushing any air bubbles or pockets out of both of said piston chambers and out of all of the corners and crevices in the actuator during bleeding thereof.

Still another object is to provide a double-acting wheel or actuator cylinder for motor vehicle brake systems which attains the foregoing objectives by the utilization of the means for sealing the pistons and piston chambers against loss of hydraulic fluid, this being accomplished by providing an annular expandable sealing ring within the respective piston chambers and a spring-pressed expander ring engaged with said sealing ring, the expander ring having passages or grooves through which the fluid must flow when the actuator is being bled, whereby the fluid is caused to follow a tortuous path swirling from one side of the piston chambers to the other to effectively flush out any and all air bubbles or pockets within the piston chambers.

Other objects and advantages of the invention will be hereinafter described, and the novel features thereof defined in the appended claims.

In the accompanying drawings:

Figure 2 is an enlarged view partly in elevation and partly in vertical section of one of the actuator cylinders of this invention and also showing portions of the disc brake assembly which are operated and controlled by the actuator cylinder;

Figure 3 is a view in vertical section, as taken on the line 3—3 of Figure 2, with certain of the parts shown in elevation;

Figure 4 is a view in horizontal section, as taken on the line 4—4 of Figure 2;

Figure 5 is a plan view of one of the fluid-directing expander rings which is adapted to encircle the pistons and cause the fluid within the piston chambers to travel in a tortuous path when the actuator is being bled;

Figure 6 is a view in vertical section, as taken on the line 6—6 of Figure 5;

Figure 7 is a transverse sectional view of an annular sealing member which is utilized to seal each piston in its piston chamber in the actuator cylinder; and Figure 8 is a fragmentary view in vertical section of a modified form of actuator cylinder and piston made in accordance with the present invention.

Like reference characters designate corresponding parts in the several figures of the drawings.

Figure 1:
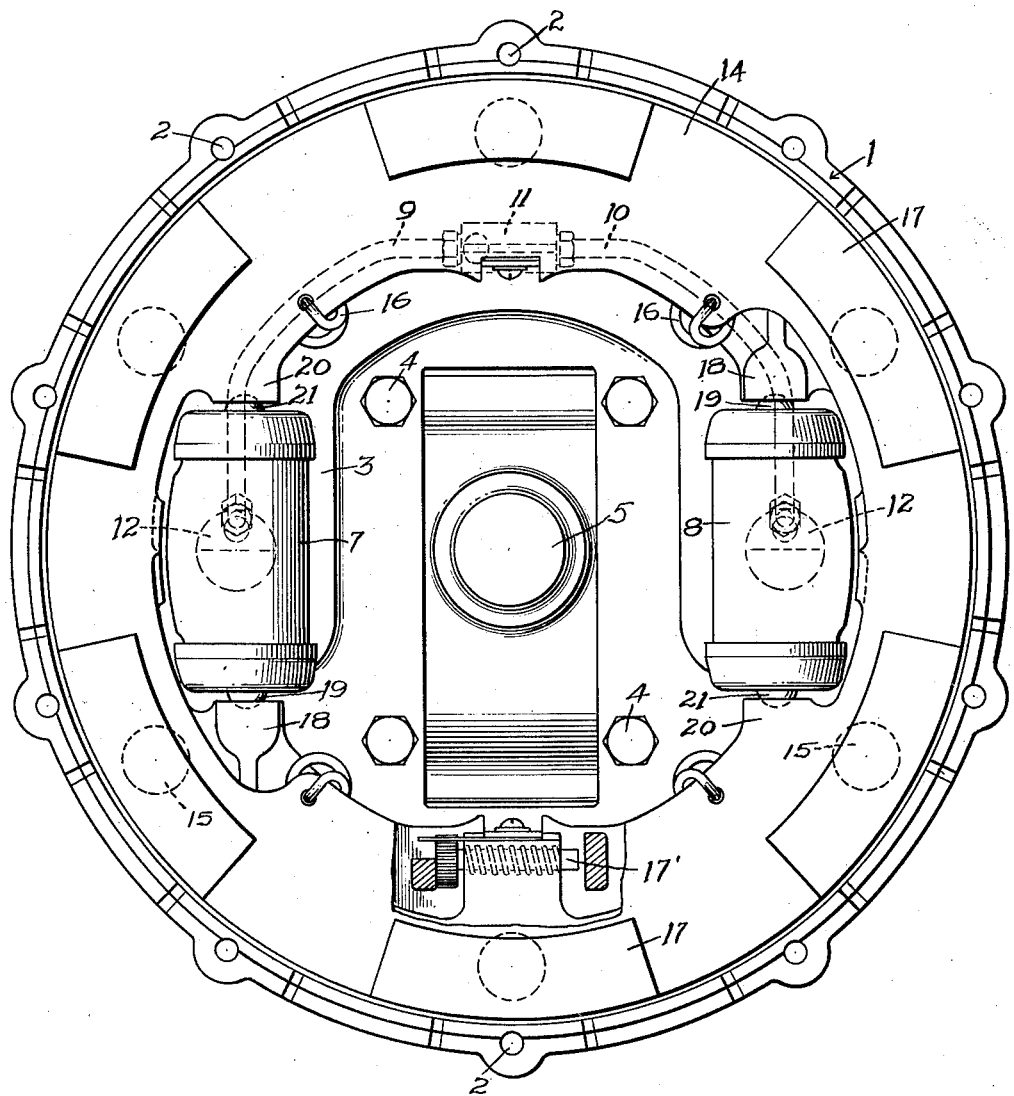
Figure 1 is a view in elevation of a disc brake embodying a pair of actuator cylinders made in accordance with this invention.

Referring first to Figure 1 of the drawings forming a part of the present application, there is shown a disc brake assembly to which the actuator cylinder of this invention is particularly adaptable, this disc brake being the subject of copending application Serial No. 238,283, filed July 24, 1951, now Patent No. 2,595,860, dated May 6, 1952.

As more particularly described in that application, the brake includes a housing, generally designated 1, which is preferably made in two parts that are adapted to be bolted or otherwise fastened together by suitable fastening means (not shown) which extend through spaced openings 2 which are provided about the periphery of the housing sections, the outboard section of the housing being omitted to show the interior of the brake construction. The outboard section of the housing is adapted to be connected by bolts or other suitable fastening means to the usual radially extended flange of a wheel-mounting hub (not shown), in the case of an automobile wheel, so that the entire brake housing or casing 1 will rotate with the wheel or other rotatable part to be braked, in either a forward or rearward direction according to the direction of movement of the vehicle or other rotary part, as the case may be.

At the inboard side of the brake housing 1, there is provided a relatively fixed or stationary backing or adapter plate generally designated 3, which forms a closure for the inboard side of the housing. This backing plate 3 is suitably fastened, as by means of bolts 4, to a flange or other part of the usual axle on the vehicle, said axle being designated 5, and in the illustrated embodiment comprising a front wheel-mounting spindle of a motor vehicle.

Rigidly mounted on and fixed to the backing plate 3 is a pair of hydraulic actuator or wheel cylinders generally designated 7 and 8, respectively, these cylinders being located in diametrically spaced relation to each other. Hydraulic lines 9, 10 branching from a fitting 11 which is rigidly supported on the backing plate 3, are respectively connected to the wheel cylinders 7, 8 for supplying hydraulic fluid under pressure to these cylinders, this hydraulic fluid being forced through these lines 9, 10 by means of a conventional master cylinder (not shown) of the hydraulic brake system of the motor vehicle. The fitting 11, as well as the branch lines 9, 10, are preferably located on the outside of the brake assembly at the inboard side thereof, in order to be connected to the actuator cylinders 7, 8 of this invention, both of which have a cylindrical boss 12 which is adapted to be extended through the backing plate 3 so as to project inwardly beyond the inboard face of this plate, as best seen in Figure 3. The actuators 7, 8 are bolted to the backing plate 3, as by means of bolts 13 extending through the backing plate and into the cylinder castings of the actuators.

Disposed within the rotary brake housing 1 and surrounding the actuator cylinders 7, 8, there is provided a double-disc unit generally designated 14, said unit including two discs of annular form which are arranged back-to-back, with a series of balls or camming members 15 disposed therebetween, said balls being seated in ramped seats formed in the opposing faces of the respective discs, and being normally held in these seats by a plurality of springs 16 yieldably connecting the two discs together. This arrangement allows the discs to move relative to each other in both a rotative direction and an axial direction. Accordingly, if a limited rotative movement is imparted to one of the discs of the double-disc unit 14, while the other disc of this unit is held relatively stationary, the discs will spread apart in an axial direction, responsive to the camming action of the balls 15. As a result of this spreading of the double-disc unit 14, the discs will frictionally engage the rotary housing 1 which is extended on opposite sides of the double-disc unit 14 so as to provide opposed axially spaced braking surfaces against which the double-disc unit will exert a powerful braking action, each disc of the double-disc unit preferably being provided with a series of friction lining segments 17 on the housing-engaging faces of the respective discs. Preferably, the double-disc assembly 14 includes automatic adjuster means 17′ for progressively compensating for wear of the friction lining segments 17 throughout the life of these linings.

In order to actuate the discs of the double-disc assembly 14 to produce the braking action in the manner just described, one of the two discs is provided with a pair of diametrically spaced lugs 18, in each of which is rockably seated a rocker or toggle pin 19, the opposite end of each rocker pin being in turn universally seated in the outer end of one of the pistons of the respective wheel cylinders 7, 8, which will be hereinafter described in detail. The other disc of the double-disc unit 14 is also provided with a pair of diametrically spaced lugs 20, in each of which is rockably seated another rocker pin 21, these pins in turn being universally seated in the other piston of the corresponding actuator cylinders 7, 8.

Preferably, there is a slight clearance between the wheel cylinders 7, 8 and the inner peripheries of the discs of the double-disc unit 14 so that the discs will not actually contact the wheel cylinders in normal use of the brake, but generally speaking, the wheel cylinders 7, 8 are adapted to support the double-disc unit 14 on the rocker pins 19, 21 with the double-disc unit concentrically located and piloted by but freely floating about the actuator cylinders 7, 8.

In energizing or operating the brake shown in Figure 1, hydraulic fluid is forced into the wheel cylinders 7, 8, between opposed pistons 22, 23 in each cylinder, thereby forcing the pistons apart, with consequent transmission of a rotative thrust against the two discs of the double-disc unit 14, and tending to rotate the respective discs in opposite directions, which in turn tends to cause the discs to move apart in an axial direction, relative to each other, responsive to the camming action of the balls 15 therebetween. As the double-disc unit engages the rotary housing 1 which is connected to a wheel or other rotary part to be braked, the frictional drag imparted by the rotary housing to the double-disc unit tends to "clock"

the double-disc unit in a direction corresponding to the direction of rotation of the housing 1, thereby forcing one of the pistons of each actuator 7, 8 inwardly of the cylinders until a portion of these pistons engages a portion of the actuator cylinder, thereby stopping further clocking movement of the double-disc unit, and anchoring one of the discs of said unit against rotation, while leaving the other disc of said double-disc unit free to rotate slightly relative to the anchored disc in response to continued pressure in the actuator cylinders and the energizing force provided by the camming action of the relatively rotatable disc.

The fluid pressure-responsive actuators 7, 8, of this invention, which are primarily intended and constructed for use with brakes of the just-described type, but are not limited to such use, will now be described in detail.

Referring more particularly to Figures 2, 3 and 4, each wheel cylinder comprises a body 24 which is preferably a one-piece casting having a centrally located partition 25 and opposed piston chambers 26, 27 disposed within the body 24 on opposite sides of the partition 25 and extending axially therefrom in opposite directions. One longitudinal side of the body 24 is laterally extended to provide a mounting portion 28 which is adapted to butt up against the backing plate 3 of a brake construction, with the aforementioned cylindrical boss 12 projecting through said backing plate, the bolts 13 also extending through said backing plate and into the portion 28 for rigidly mounting the wheel cylinder on the backing plate 3.

The portion of the cylindrical boss 12 which projects inwardly past the inboard side of the backing plate 3 has angularly disposed faces 29 diverging toward the backing plate 3. The body 24 is provided with an inlet-outlet opening 30 extending at a right angle from one of the inclined faces 29 through the cylindrical boss 12 and into the piston chamber 27 adjacent to the central partition 25, this inlet-outlet opening being enlarged and screw-threaded, as at 31, at its outer end for connection with one of the branch lines 9, 10. The portion 28 of the body 24 is also provided with a bleed opening 32 extending into the piston chamber 26, the outer end of this opening being enlarged and screw-threaded, as at 33, for receiving a bleeder valve (not shown). The backing plate 3 is provided with an opening 34 therethrough in axial alignment with the bleed passage 32 to accommodate the aforementioned bleeder valve. The central partition 25 is provided with a relatively small fluid passage 35 therethrough, whereby fluid under pressure may pass into the piston chamber 26 from the piston chamber 27, and vice versa, thus passage 35 not only establishing communication between the piston chambers 26 and 27, but also serving to restrict the fluid flow therethrough and thus damp or cushion the inward movements of the pistons 22 and 23 during "clocking" of the double-disc unit 14 in either direction, thereby eliminating noise that otherwise would result from metal-to-metal contact of the pistons against the partition 25 in anchoring one of the discs against rotation during the braking action.

The pistons 22, 23 in the embodiment shown in Figures 2, 3 and 4, each include a reduced shank 36, this shank 36 being adapted to abut against the inner partition 25 for limiting inward movement of the pistons within the piston chambers 26, 27. The outer end of each piston 22, 23 is provided with a substantially conical recess 37 in which the rocker or toggle pins 19, 21 are universally seated. The outer ends of the rocker pins 19, 21 are each provided with a substantially hemispherical head 38 which rockably seats in the lugs 18, 20 on the discs of the double-disc unit 14. The rocker pins are each provided with an annular recess 39 for receiving an annular shoulder 39' defining a central opening in a resilient dust-cap 40, these dust-caps 40 also having a shoulder 41' adapted to be snapped into a peripheral groove or recess 41 at each end of the body 24.

Means are provided for sealing the pistons and piston chambers against the loss of hydraulic fluid and for causing the hydraulic fluid to travel in a tortuous path when the device is being bled, said means including a flexible annular sealing ring or gasket 42 disposed about the reduced shank portion 36 of each piston 22, 23 in sealing relation with the walls of the piston chambers 26, 27. An annular expander member 43 encircles the shank of each piston, this expander having a beveled portion 44 adapted to project into the recess 45 in the sealing ring 42 to expand the sealing ring responsive to the pressure of a coiled compression spring 46 which is interposed between the expander 43 and the central partition 25, the expander 43 having an annular shoulder 47 for engagement by the spring 46.

The fluid-directing means for causing the hydraulic pressure fluid to travel in a tortuous path when the device is being bled, includes a transverse groove or recess 48 which is transversely disposed across the inner end of the reduced shank 36 of each of the pistons 22, 23, so as to register with the small passage 35 through the central partition 25 of the wheel cylinder. In addition, the fluid-directing means includes a plurality of fluid-directing passages formed in the walls of the annular member or expander 43, these passages comprising a pair or set of annularly spaced vertical grooves 49 in the outer vertical peripheral wall 50, and a second pair or set of vertically disposed passages 51 in annularly spaced relation through the shoulder 47 with which the spring 46 is engaged, this shoulder 47 also cooperatively engaging about its inner peripheral surface with the shank 36 of the pistons 22, 23 for properly positioning the expander about said pistons within the piston chambers 26, 27. The expander 43 is also provided with a third pair or set of fluid-directing passages 52 disposed in annularly spaced relation in an angularly disposed continuation 44 of the wall 50. These three sets of passages 49, 51 and 52 are best shown in Figures 5 and 6, and it will be seen that the passages 52 are annularly displaced 90° from the passages 49 and 51, although this specific relationship of the passages with respect to each other is purely illustrative, and the passages may be in any desired location with respect to each other, as may be determined by the number of passages in each set.

Referring now to Figure 8, there is shown a fragmentary portion of a modified form of a wheel cylinder made in accordance with the present invention. Generally, the detailed construction of this modified form is identical to that of the construction just described, and therefore, the reference characters applied to this figure are the same as those utilized hereinbefore except that these reference characters have been primed, and new reference characters have been applied to the modified features. In this form, the reduced shank 36' of the piston 23' is shortened to some extent and the piston chamber 27' is enlarged at its outer end to provide a stop shoulder 53 against which an enlarged head 54 on the outer end of the piston 23' is adapted to abut for limiting inward movement of the piston 23'. In this modified form, moreover, there is no need for the transverse grooves 48 with which the pistons 22, 23 are provided, as will be apparent from the following description of the operation of a wheel cylinder made in accordance with this invention.

When it is desired to bleed the wheel cylinders 7, 8, the bleeder valve (not shown), which is located in the enlarged portion 33 of the bleed passage 32 through the portion 28 of each wheel cylinder, is opened. Pressure produced by the master cylinder (not shown) will then force the hydraulic fluid through the inlet passage 30 into the piston chamber 27, the fluid being deflected by the shoulder 47 on the expander 43, which causes the fluid to flow around the reduced shank 36 of the piston 23 until it finds access to the vertical passages 51 through the shoulder 47. The fluid will then flow between the inner lip of the sealing ring or gasket 42 and the expanding edge of the expander 43 into the recess 45 of the sealing ring 42 where it is again deflected and caused to swirl and wash out any air bubbles or pockets which may be present, and from there through the passages 52 in the inclined portion 44 of the expander 43. The fluid is then again deflected and caused to wash around the inclined face 44 of the expander, until it reaches the vertical passages 49 through the vertical portion 50 of the expander, and from there, the fluid flows freely through the passages 49 to the inner end of the piston chamber 27 where it enters into the open ends of the transverse groove 48 in the inner end of the piston 23, thence flowing through the reduced passage 35 into the piston chamber 26 where it is deflected laterally through the groove 48 in the piston 22. From here, the fluid flows upwardly through the passages 51 of the expander 43 encircling the piston 22, thence into the recess 45 in the upper sealing ring 42, and thence downwardly through the passages 52 in the inclined portion 44 of the expander ring 43, and finally through the bleed passage 32, as generally indicated by the directional arrows in Figures 2 and 3.

Thus it is apparent that the fluid is being continually deflected and re-directed by the expander rings 43 in the piston chambers 26, 27 in such manner as to cause the fluid to travel in a tortuous path and to swirl and wash small bubbles of air that tend to cling to the surfaces and corners out of the actuator cylinder, this tortuous travel of the fluid being caused by the annularly displaced passages 51, 52, and 49 through which the fluid must flow, as well as by the shoulders 47 and the flat faces 44 of the expander rings 43 about which the fluid must flow in order to gain access to the aforementioned passages.

It will be understood from the above that the bleeding procedure as described in the foregoing can be performed separately for each of the actuators 7 and 8, or simultaneously if preferred, and in either case, the pressure fluid should be forced through the hydraulic system and through the wheel cylinders until all air has been effectively flushed or washed out of the system. Thereafter, the system can be refilled with hydraulic fluid to replenish any fluid that is lost or wasted by the flushing operation, and to insure an adequate supply of pressure fluid in the system to enable the brake to be properly operated in the regular manner, under the control of the usual master cylinder.

While the specific details of the invention have been herein shown and described, the invention is not confined thereto as changes and alterations may be made without departing from the spirit thereof as defined by the appended claims.

We claim:

1. A fluid pressure responsive actuator device of the class described, comprising a body having a piston chamber therein, and a piston disposed within said chamber, said body being provided with a pressure fluid inlet-outlet opening and also with a bleed opening, both of said openings communicating with said chamber, and fluid-directing means within said chamber for directing the pressure fluid in a tortuous path through said chamber and around said piston to the bleed opening aforesaid when a pressure fluid is forced through the device, said fluid-directing means comprising an annular member encircling said piston and having fluid passages therein.

2. A fluid pressure responsive actuator device of the class described, comprising a body having a piston chamber therein, and a piston disposed within said chamber, said body being provided with a pressure fluid inlet-outlet opening and also with a bleed opening, both of said openings communicating with said chamber, and fluid-directing means within said chamber for directing the pressure fluid in a tortuous path through said chamber and around said piston to the bleed opening aforesaid when a pressure fluid is forced through the device, said fluid-directing means comprising an annular member encircling said piston and having fluid passages therethrough, the fluid passages being disposed at diametrically opposite positions about the central axis of said annular member.

3. A fluid pressure responsive actuator device of the class described, comprising a body having a piston chamber therein, and a piston disposed within said chamber, said body being provided with a pressure fluid inlet-outlet opening and also with a bleed opening, both of said openings communicating with said chamber, and fluid-directing means within said chamber for directing the pressure fluid in a tortuous path through said chamber and around said piston to the bleed opening aforesaid when a pressure fluid is forced through the device, said fluid-directing means comprising an annular member encircling said piston within said cylinder and having a plurality of fluid-directing passages therethrough, said passages being disposed at circumferentially spaced positions about the annular member.

4. A fluid pressure responsive actuator device of the class described, comprising a body having a piston chamber therein, and a piston disposed within said chamber, said body being provided with a pressure fluid inlet-outlet opening and also with a bleed opening, both of said openings communicating with said chamber, and fluid-directing means within said chamber for directing the pressure fluid in a tortuous path through said chamber and around said piston to the bleed opening aforesaid when a pressure fluid is forced through the device, said fluid-directing means comprising an annular member encircling said piston and having its inner periphery engaged with said piston and its outer periphery having a portion engaged with the wall of the piston chamber, said annular member having a plurality of fluid-directing passages circumferentially spaced about the inner periphery aforesaid and a plurality of fluid-directing passages circumferentially spaced about the outer periphery aforesaid.

5. A fluid pressure responsive actuator device of the class described, comprising a body having a piston chamber therein, and a piston disposed within said chamber, said body being provided with a pressure fluid inlet-outlet opening and also with a bleed opening, both of said openings communicating with said chamber, and fluid-directing means within said chamber for directing the pressure fluid in a tortuous path through said chamber and around said piston to the bleed opening aforesaid when a pressure fluid is forced through the device, said fluid-directing means comprising an annular member encircling said piston and having its inner periphery engaged with said piston and its outer periphery having a portion engaged with the wall of the piston chamber, said annular member having a plurality of fluid-directing passages circumferentially spaced about the inner periphery aforesaid and a plurality of fluid-directing passages circumferentially spaced about the outer periphery aforesaid, the fluid-directing passages about said inner periphery being annularly displaced with respect to at least some of the fluid-directing passages about said outer periphery.

6. A fluid pressure responsive actuator device of the class described, comprising a body having a piston chamber therein and a reciprocable piston disposed within said chamber, said body being provided with a pressure fluid inlet-outlet opening and also with a bleed opening, said piston being engageable with said body for limiting movement of said piston in one direction, and an annular member disposed about said piston within said piston chamber, said annular member including means for directing pressure fluid in a tortuous path through said chamber and around said piston to the bleed opening aforesaid when a pressure fluid is forced through the device.

7. A fluid pressure responsive actuator device as defined in claim 6, wherein the piston comprises a shank portion engageable with said body for limiting movement of the piston in one direction as aforesaid.

8. A fluid pressure responsive actuator device as defined in claim 6, wherein the body is provided with an annular shoulder near the outer end of the piston chamber, and the piston is provided with an annular shoulder engageable with the shoulder on said body for limiting movement of the piston in one direction as aforesaid.

9. A hydraulic actuator of the class described, comprising a body having opposed inter-communicating piston chambers therein, and oppositely shiftable pistons disposed within the respective piston chambers, said body having a pressure fluid inlet-outlet opening communicating with one of said piston chambers and also a bleed opening communicating with the other of said piston chambers, and a fluid-directing member disposed about each of said pistons within said piston chambers for directing a pressure fluid in a tortuous path through each of said piston chambers and about said pistons to said bleed opening when a pressure fluid is admitted into the inlet-outlet opening and forced through the actuator.

10. A hydraulic actuator as defined in claim 9, wherein each fluid-directing member is of annular form and is provided with an inner and an outer cylindrical surface, said outer cylindrical surface being extended at one end at an angle and inclined towards said inner cylindrical surface, said inner cylindrical surface being provided with an annular shoulder extending radially inwardly therefrom, said shoulder having a set of axially extended fluid passages therethrough, said outer inclined surface having a set of fluid passages also extended axially therethrough, and said outer cylindrical surface also having a set of fluid passages axially extended therethrough.

11. A hydraulic actuator as defined in claim 9, wherein the fluid-directing member is of annular form and is provided with an inner and an outer cylindrical surface, said outer cylindrical surface being extended at one end at an angle and inclined towards said inner cylindrical surface, said inner cylindrical surface being provided with an annular shoulder extending radially inwardly therefrom, said shoulder having a set of axially extended fluid passages therethrough, said outer inclined surface having a set of fluid passages also extended axially therethrough, and said outer cylindrical surface also having a set of fluid passages axially extended therethrough, the set of passages through said shoulder and said outer cylindrical surface being annularly displaced with respect to the set of passages through said inclined outer surface.

12. An actuator device for hydraulic brakes and the like, comprising a body having a pair of opposed piston chambers therein, a central partition separating said piston chambers and having a restricted fluid passage therethrough for establishing inter-communication between said opposed chambers, oppositely reciprocable pistons in the respective piston chambers, said body also having an inlet-outlet passage extending into one of said piston chambers and having a bleed passage extending into the other piston chamber, a flexible annular sealing gasket encircling each of said pistons, and an annular expander member engaged with each of said sealing gaskets, said expander members each having means for directing a pressure fluid in a tortuous path through its corresponding piston chamber when a pressure fluid is forced through the device from said inlet-outlet passage to said bleed passage.

13. An actuator device as defined in claim 12, wherein the pressure fluid directing means comprises an internal shoulder on the expander member engageable with said piston and having a set of fluid passages therethrough, an angularly disposed exterior surface for expanding engagement with said sealing gasket and having a second set of fluid passages therethrough displaced with respect to said first set, and a cylindrical exterior surface engageable with the wall of said piston chamber and having a third set of fluid passages therethrough displaced with respect to said second set.

14. An actuator device as defined in claim 12, wherein the inner end of each piston is provided with a transverse groove in register with the passage through said partition for enabling the pressure fluid to flow from one piston chamber into the other when the inner end of either piston is in engagement with said partition.

15. A fluid-directing member of the class described, comprising an annular member having an inner periphery and an outer periphery, said inner periphery being provided with a shoulder having a set of fluid passages therethrough, and said outer periphery having a relatively straight wall and an angularly disposed wall, each wall having a set of fluid passages therethrough.

16. A fluid-directing member as defined in claim 15, wherein the set of fluid-directing passages in the angularly disposed wall is annularly displaced with respect to the set of fluid passages through said shoulder, and the set of fluid passages through the relatively straight wall is annularly displaced with respect to the set of fluid passages through said angularly disposed wall.

CLAUDE R. MYERS.
LESTER F. DASSE.
JOHN BASSETT.

References Cited in the file of this patent

UNITED STATES PATENTS

| Number | Name | Date |
| --- | --- | --- |
| 2,166,804 | Dick | July 18, 1939 |
| 2,213,948 | Bowen | Sept. 17, 1940 |
| 2,214,951 | Bock | Sept. 17, 1940 |
| 2,513,015 | Fike | June 27, 1950 |
| 2,571,538 | Christensen | Oct. 16, 1951 |